United States Patent
Lochbihler

(10) Patent No.: US 9,268,070 B2
(45) Date of Patent: Feb. 23, 2016

(54) SECURITY ELEMENT HAVING A COLOR-EFFECT-PRODUCING STRUCTURE

(71) Applicant: GIESECKE & DEVRIENT GMBH, Munich (DE)

(72) Inventor: Hans Lochbihler, Munich (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 0 days.

(21) Appl. No.: 14/420,548

(22) PCT Filed: Aug. 5, 2013

(86) PCT No.: PCT/EP2013/002338
§ 371 (c)(1),
(2) Date: Feb. 9, 2015

(87) PCT Pub. No.: WO2014/023415
PCT Pub. Date: Feb. 13, 2014

(65) Prior Publication Data
US 2015/0219807 A1    Aug. 6, 2015

(30) Foreign Application Priority Data

Aug. 10, 2012  (DE) .......................... 10 2012 015 900

(51) Int. Cl.
*G02B 5/18* (2006.01)
*B42D 25/328* (2014.01)
(Continued)

(52) U.S. Cl.
CPC .............. *G02B 5/1842* (2013.01); *B42D 25/00* (2014.10); *B42D 25/29* (2014.10); *G02B 5/008* (2013.01);
(Continued)

(58) Field of Classification Search
CPC .... G02B 5/008; G02B 5/1809; G02B 5/1814; G02B 5/1842; G02B 5/1861; B42D 25/29; B42D 2033/10; B42D 25/00; B42D 2033/04; B42D 2033/24; B42D 25/324; B42D 25/328
See application file for complete search history.

(56) References Cited

U.S. PATENT DOCUMENTS 7,611,168 B2   11/2009  Heim
7,680,274 B2    3/2010  Tompkin et al.
(Continued)

FOREIGN PATENT DOCUMENTS

CN        1646331 A     7/2005
CN      102177029 A     9/2011
(Continued)

OTHER PUBLICATIONS

International Search Report from corresponding PCT Application No. PCT/EP2013/002338, Oct. 2, 2013.
(Continued)

*Primary Examiner* — James Phan
(74) *Attorney, Agent, or Firm* — Workman Nydegger

(57) ABSTRACT

A security element for an object of value has a flat, transparent body with a front side and a back side between which there lies a center plane, a first region configured on the body and a second region configured on the body which encode a motif. The body has in the first region a ground element structure which conveys different color impressions from front and back sides in plan view of the body. The body likewise has the ground element structure in the second region and is in mirrored form relative to the center plane, causing first and second regions to show the motif from both sides in plan view, and the motif to be unrecognizable in transmission view.

20 Claims, 12 Drawing Sheets

(51) Int. Cl.
*G02B 5/00* (2006.01)
*B42D 25/29* (2014.01)
*B42D 25/00* (2014.01)
*B42D 25/324* (2014.01)

(52) U.S. Cl.
CPC ............ *G02B 5/1809* (2013.01); *G02B 5/1814* (2013.01); *G02B 5/1861* (2013.01); *B42D 25/324* (2014.10); *B42D 25/328* (2014.10); *B42D 2033/04* (2013.01); *B42D 2033/10* (2013.01); *B42D 2033/24* (2013.01)

(56) References Cited

U.S. PATENT DOCUMENTS

| | | | |
|---|---|---|---|
| 2005/0082819 A1 | 4/2005 | Tompkin et al. | |
| 2010/0307705 A1* | 12/2010 | Rahm .................... | B42D 25/00 162/140 |
| 2011/0139024 A1 | 6/2011 | Schiffmann | |
| 2012/0170124 A1 | 7/2012 | Fuhse et al. | |
| 2012/0235399 A1 | 9/2012 | Lochbihler | |
| 2012/0242075 A1 | 9/2012 | Lochbihler | |

FOREIGN PATENT DOCUMENTS

| | | |
|---|---|---|
| CN | 102463768 A | 5/2012 |
| DE | 102007016394 A1 | 10/2008 |
| DE | 102009012299 A1 | 9/2010 |
| DE | 102009012300 A1 | 9/2010 |
| DE | 102009056933 A1 | 6/2011 |
| EP | 0271673 A1 | 6/1988 |
| EP | 2228671 A1 | 9/2010 |
| FR | 2967089 A1 | 5/2012 |
| WO | 03/070482 A1 | 8/2003 |
| WO | 2011032665 A1 | 3/2011 |
| WO | 2011066992 A1 | 6/2011 |
| WO | 2011082761 A1 | 7/2011 |

OTHER PUBLICATIONS

Ebbesen, T.W. et al., "Extraordinary Optical Transmission Through Sub-Wavelength Hole Arrays", Letters to Nature, Nature, vol. 391, Feb. 12, 1998, pp. 667-669.
Martin-Moreno, L. et al., "Theory of Extraordinary Optical Transmission Through Subwavelength Hole Arrays", Physical Review Letters, The American Physical Society, vol. 86, No. 6, Feb. 5, 2001, pp. 1114-1117.
Barnes, William L. et al., "Surface Plasmon Subwavelength Optics", Insight Review Articles, Nature, vol. 424, Aug. 14, 2003, pp. 824-830.
Bravo-Abad, J. et al., "How Light Emerges from an Illuminated Array of Subwavelength Holes", Nature Physics, vol. 2, Feb. 2006, pp. 120-123.
Lee, Hong-Shik et al., "Color Filter Based on a Subwavelength Patterned Metal Grating", Optics Express, vol. 15. No. 23, Nov. 12, 2007, pp. 15457-15463.
Huang, Cheng-ping et al., "Dual Effect of Surface Plasmons in Light Transmission Through Perforated Metal Films", Phys. Rev.B 75, 245421, 2007, 22 pages.
Cheong, Byoung-Ho et al., "High Angular Tolerant Color Filter Using Subwavelength Grating", Applied Physics Letters, vol. 94, American Institute of Physics, 2009, pp. 213104-1-213104-3.
Cho, Eun-Hyoung et al., "Two-Dimensional Photonic Crystal Color Filter Development", Optics Express, vol. 17, No. 10, May 11, 2009, pp. 8621-8629.
Cho, Eun-Hyoung et al., "Nanoimprinted Photonic Crystal Color Filters for Solar-Powered Reflective Displays", Optics Express, vol. 18, No. 26, Dec. 20, 2010, pp. 27712-27722.
Potton, R.J., "Reciprocity in Optics", Reports on Progress in Physics, vol. 67, Institute of Physics Publishing, Apr. 26, 2004, pp. 717-754.
International Preliminary Report on Patentability from corresponding PCT Application No. PCT/EP2013/002338, Feb. 10, 2015.

* cited by examiner

SECURITY ELEMENT HAVING A COLOR-EFFECT-PRODUCING STRUCTURE

BACKGROUND

This invention relates to a security element for an object of value, said element having a flat, transparent body with a front side and a back side between which there lies a center plane, a first region configured on the body and a second region configured on the body which encode a motif, said body having in the first region a ground element structure which conveys different color impressions from front and back sides in plan view of the body.

Security elements of value documents having periodic line gratings are known, for example from DE 102009012299 A1, DE 102009012300 A1 or DE 102009056933 A1. They can have color filter properties in the subwavelength region when the grating is so designed with regard to the grating profile that resonance effects occur in the visible wavelength region. Such color filter properties are known both for reflective and for transmissive subwavelength structures. Said structures have a strongly polarizing influence on the reflection or the transmission of an incident light ray. The color is relatively strongly dependent on angle in reflection or transmission of such subwavelength gratings. However, the color saturation is considerably weakened for said gratings when the incident light is unpolarized.

There is known a line grating having subwavelength structures which possesses angular-dependent, color-filtering properties. The line grating possesses a rectangular profile made of a dielectric material. The horizontal surfaces are overlaid with a high-refractive dielectric. Above this structure there is likewise located a dielectric material, with the refractive indices of the grating substrate and of the cover material preferably being identical. As a result there is formed an optically active structure consisting of two gratings made of the high-refractive material which are spaced by the height of the original rectangular profile. The grating ridges forming the line grating are made for example of ZnS. There can be produced therewith a color contrast in reflection, but in transmission a change of color tone for different angles is hardly perceptible. This structure is therefore only useful as a security feature in reflection and must be constructed on an absorbent ground for that purpose.

Two-dimensionally periodic hole structures are described in the scientific literature that have filter properties of the incident light in the subwavelength region. In this connection, reference is made to the following literature sources: T. W: Ebbesen et al., "Extraordinary optical transmission through sub-wavelength hole arrays", Nature, 667-669 (1998); L. Martin-Moreno et al., "Theory of extraordinary optical transmission through subwavelength hole arrays", Phys. Rev. Lett. 86(6), 1114-1117 (2001); W. L. Barnes et al., "Surface plasmon subwavelength optics", Nature, Vol 424, Issue 6950, pp. 824-830 (2003); J. Bravo-Abad et al., "How light emerges from an illuminated array of subwavelength holes", Nature Physics 1, 120-123 (2006); H. S. Lee et al., "Color filter based on a subwavelength patterned metal grating", Opt. Express 15, 15457-15463 (2007); C.-P. Huang et al., "Dual effect of surface plasmons in light transmission through perforated metal films", Phys. Rev. B 75, 245421 (2007). Such so-called hole arrays consist of thin opaque metal films.

DE 102007016394 A1 proposes employing such structures as security elements in value documents for authenticating genuineness.

Further, two-dimensionally periodic gratings are known that allow a color filtering in primary colors, red, green, blue, with high color saturation over a relatively great viewing-angle range. The publication B.-H. Cheong et al., "High angular tolerant color filter using subwavelength grating", Appl. Phys. Lett. 94, 213104 (2009) describes a grating with cube-shaped elevations which has a pronounced band-pass filter characteristic. The elevations are made of amorphous silicon and located on a glass substrate. A replication method for such gratings is presented in the publications E.-H. Cho et al., "Two-dimensional photonic crystal color filter development", Opt. Express 17, 8621-8629 (2009) and E.-H. Cho et al., "Nanoimprinted photonic crystal color filters for solar-powered reflective displays", Opt. Express 18, 27712-27722 (2010).

The prior art further includes WO 2003/070482 A1, WO 2011/032665 A1, WO 2011/082761 A1, WO 2011/066992 A1, EP 2228671 A1. The publications R. J. Potton, "Reciprocity in optics", Rep. Prog. Phys. 67, 717 (2004); R. Petit, "Electromagnetic theory of gratings", Vol 22 of Topics in current physics, Springer-Verlag (1980), explain the principle of reciprocity in optics, in particular for gratings.

The grating structures from the prior art can be employed for security elements for protecting value documents, since they provide a color effect in plan view that is not reproducible by conventional copying methods. The angle dependency of the color effect is especially advantageous therefor.

SUMMARY

The invention is based on the object of developing a security element of the type stated at the outset so as to further increase the anti-forgery security.

This object is achieved, in a first variant, by a security element for an object of value, which has: a flat, transparent body having a front side and a back side between which there lies a center plane, a first region configured on the body and a second region configured on the body which encode a motif, wherein the body has in the first region a ground element structure which conveys different color impressions from front and back sides in plan view of the body, wherein the body likewise has the ground element structure in the second region, but in a form mirrored relative to the center plane, causing first and second regions to show the motif from both sides in plan view, but the motif to be unrecognizable in transmission view.

The object is achieved, in a second variant, by a security element for an object of value, which has a flat, transparent body having a front side and a back side, a first region configured on the body and a second region configured on the body which encode a motif, wherein the body has a grating ground structure which is filled with a first layer from the front side and with a second layer from the back side, and which conveys different color impressions from front and back sides in plan view, wherein the grating ground structure is the same in the first and in the second region, and in the first region the first layer has a first refractive index and the second layer a second refractive index, and in the second region the first layer has the second refractive index and the second layer the first refractive index, causing first and second regions to show the motif from both sides in plan view, but the motif to be unrecognizable in transmission view.

The invention provides in both variants a security element that shows a colored motif from both front and back sides in reflection. However, said motif disappears completely in transmission even for different viewing angles. The security element allows a fine design of motifs and can be manufactured by standard embossing methods. Unless reference is expressly made to one of the two variants hereinafter, the following statements will apply equally to both variants.

The invention utilizes the universally valid law of reciprocity of the optical path in a surprisingly manner. For the transmission of an optical path through a medium it is thus irrelevant in which direction different layers are passed through. Since the ground element structure is the same in the first and second regions with regard to the layers or structures present, the security element has no motif in the transmission mode. However, since in the first and second regions the ground structures are inverted against each other relative to the center plane in the first variant, and the order of layers inverted in the second variant, different color impressions for the two regions result from front or back side in plan view, which encodes the motif.

The ground element structure can be embodied in different ways. Thus, in the first variant, it is possible to realize the ground element structure by a substrate having different interference layers on its cover surfaces. The ground element structure can also be realized by a grating ground structure in the first variant. When a grating ground structure is referred to in the following description of the first variant, this is to be understood only by way of example.

With regard to the grating ground structure, the effect of the security element is not restricted only to periodic structures. Quasi-statistical structures can also be employed, as long as such structures, which likewise constitute grating ground structures for the purposes of this invention for both variants, convey different color impressions from front and back sides.

In the first variant, the mirroring of the ground element structure on the center plane interchanges front and back sides for the second region. Thus, first and second regions differ both from front side and from back side in plan view. Since in transmission the same layers are passed through in both the first and second regions and the order of said passage is irrelevant for the transmission due to the physical principle of reciprocity, the first and second regions do not differ in transmitted light.

The invention provides in both variants, starting out from per se known ground element structures, e.g. grating structures, a security element that shows a motif in plan view which disappears in transmissive viewing. Such an effect cannot be imitated with conventional copying methods, thereby giving the security element high anti-forgery security.

Grating ground structures that convey different color impressions from front and back sides in plan view can be produced especially simply by the grating ground structure being asymmetrical relative to the grating plane.

In the first variant, the mirroring of the grating ground structure on the center plane then corresponds to the producing of the inverse grating structure. The first and second regions can thus be characterized, in this embodiment of the first variant, by a grating structure being employed in the first region, and the inverse or negative form thereof being used for the grating in the second region.

The mirroring operation for the second region leads of course to a discontinuity on the boundary between the first and second regions. There can therefore optionally be provided a transition zone between first and second regions which is smaller than a grating period and in which the grating ground structure of the first region runs into the mirrored form of the second region.

Especially good color effects in plan view result with grating structures that are not substantially greater than the wavelength. It is therefore preferred that the grating ground structure has a grating period of 100 nm to 1000 nm. Especially good color effects are shown by subwavelength gratings, so that a grating period between 200 nm and 500 nm is preferred. Gratings are subwavelength gratings for the purposes of the invention when the individual grating elements are smaller than the wavelength in the region of light.

The security element reveals the motif more clearly the more different the color effect is from the front and back sides in plan view, since, in the first variant, front and back sides of the ground element structure are interchanged in the second region relative to the first region in order to produce the motif. An especially good difference between front-side view and back-side view is then obtained in a grating ground structure that is overlaid with a thin metal layer, a semimetal layer or a high-refractive layer with a partly absorbent effect.

Examples of an asymmetrical grating ground structure are grating elements that are trapezoidal or triangular in profile.

The first and second regions can in turn be patterned further. This can be obtained especially simply by the grating ground structure being two-dimensionally periodic. Such a structure is furthermore especially forgery-proof, because it is hard to manufacture with the usual tools available to forgers.

This also holds for grating ground structures having cuboid elevations and depressions.

Preferably, the grating ground structure in a 2D-periodic embodiment has a contiguous high-refractive (in particular metallic) ground layer which defines a grating plane, and over the ground layer a two-dimensionally regular pattern of individual high-refractive (in particular metallic) surface elements which respectively extend parallel to the grating plane and are respectively spaced from the ground layer by an interlevel dielectric or an intermediate layer by a distance that is greater than the thickness of the ground layer and of the surface elements. Optionally, the regular pattern has a periodicity between 100 nm and 800 nm, preferably between 200 nm and 500 nm, in at least two directions extending parallel to the grating plane.

The grating structure provides in the 2D-periodic embodiment further preferably a high-refractive ground layer as well as high-refractive surface elements which are disposed over the ground layer. The high-refractive property of the ground layer and of the surface elements is obtained by a suitable choice of material. Besides metal as a material, one might consider in particular silicon or silicon monoxide. In this description the term "metallic" is understood to be equivalent to "high-refractive", unless expressly described otherwise.

It is essential for the effect of this embodiment that a contiguous metallic layer has disposed thereover non-contiguous surface elements disposed in a pattern. When a two-dimensionally periodic grating with a profile possessing perpendicular flanks is metal-vapor-coated perpendicularly, a non-closed metal film arises on plateaus on the grating's upper side. On the lower grating surface (ground layer) a contiguous metal film forms. The elevations of the profile are overlaid with metal only on the plateaus.

The non-vapor-coated grating structure optionally consists of a dielectric material having e.g. a refractive index of about 1.5. Plastic foils, e.g. PET foils, are particularly suitable as a substrate. The actual base structure is e.g. likewise configured in plastic, preferably UV lacquer. After vapor coating, the structure finally is filled with UV lacquer and laminated with a cover foil. Thus a layer construction is present wherein the upper and lower sides possess substantially the same refractive index.

Further, the coating is not only restricted to simple metallic layers. Multiple layers, in particular trilayers, are also conceivable. It is known that multiply coated one-dimensionally periodic gratings enable a strong color filter filtering through the formation of Fabry-Perot resonators both in reflection and in transmission. In trilayers the following layers are particularly preferred: two semitransparent metal layers with an interjacent dielectric spacer layer, or two high-refractive layers with an interjacent low-refractive layer. For the metal layers the following materials come into consideration: Al, Ag, Pt, Pd, Au, Cu, Cr and alloys thereof. Suitable high-refractive layers are for example ZnS, ZnO, $TiO_2$, ZnSe, SiO, $Ta_2O_5$ or silicon. As low-refractive layers, $SiO_2$, $Al_2O_3$ or $MgF_2$ might be used.

In an especially expedient manufacturing method, a dielectric is first patterned suitably as a base structure and then coated. Then the ground layer has an opening in the region under each surface element. This is advantageous at the same time, since an optical effect then also arises in transmission.

It is preferred that the grating is embedded into an embedding dielectric which has the same refractive index as the dielectric which forms the base structure and spaces the ground layer from the surface elements. The refractive index can lie for example between 1.4 and 1.6.

It has turned out that the color effects of the grating ground structure can be influenced by the periodicity of the pattern. This can be utilized for producing colored symbols or images. For this purpose, the surface filling factor and/or the distance between surface elements and ground layer can be varied locally. In particular, it is possible to design a group of a plurality of surface elements with identical dimensions such that a desired color effect occurs. This group then forms a subpixel. A plurality of subpixels are designed with different color properties through corresponding geometrical design and then combined into a pixel. This allows a colored image representation. The different colors can be varied through the corresponding local variation of one or more of the parameters of the grating (distance of the surface elements in two spatial directions as well as distance of the surface elements from the ground layer).

Through the pixel-wise color mixture of basic colors, e.g. RGB colors, in subpixel regions there can be produced true-color images. The advantage of such structures over conventional printing technology is that a very fine patterning into the micrometer range can be performed here.

A ground element structure suitable for the first variant and employing no grating is a substrate with different interference layers disposed on its cover surfaces. Such a substrate can be simply formed into the security element by suitably patterning front and back sides. It is only essential that the reflection behavior is different on the first and second cover sides for the interference construction. This is obtained by the ground element structure being asymmetrical relative to the center plane, because the layers on the cover surfaces differ in their thickness or in their material composition or both. The layer construction is consequently mirrored in the first region relative to the second region.

The regionally different patterning can be achieved with conventional methods, for example a washing method or by laser demetallization.

For the layers there come into consideration a multiplicity of interference layers which differ with regard to their reflecting properties on a substrate. Thus, color-shift layer systems are suitable. Also, opaque layer materials can be employed which are present in partly perforated form in order to obtain the required transmission.

The employment of perforated layers has the advantage that the layers on front and back sides of the substrate can first be applied unpatterned and are then only processed differently with regard to their perforation in order to form first and second regions. The perforation can be carried out for example using a pulsed laser beam, etc.

To obtain a color effect in transmission, the substrate can be dyed.

The above-mentioned effect of the reciprocity of the optical path also holds in case different refractive indices are present on the boundary surfaces of the grating ground structure and the half-space located thereabove or therebelow. The second variant of the invention makes use of this, and can thereby employ a grating ground structure that is substantially the same in the first and second regions. The different color effect then arises only from the order of layers that is provided in the first region, i.e. the order of layers over the grating ground structure and under the grating ground structure, being inverted in the second region. The layer material located over the grating ground structure in the first region is disposed under the grating ground structure in the second region, and vice versa.

The security element can be employed for a value document. It can in particular be integrated in a security thread, tear thread, security band, security strip, patch or label. In particular, the security element can span transparent regions or recesses of the value document.

The security element can in particular be part of a precursor, not yet fit for circulation, for a value document which can additionally have further authentication features. Value documents are understood to be, on the one hand, documents that are furnished with the security element. On the other hand, value documents can also be other documents or objects that are furnished with the security element in order for the value documents to have uncopiable authentication features to enable an authenticity test and prevent unwanted copies. Chip cards or security cards, such as e.g. bank cards or credit cards or identity cards, are further examples of value documents.

It will be appreciated that the features mentioned hereinabove and those to be explained hereinafter are usable not only in the stated combinations but also in other combinations or in isolation without going beyond the scope of the present invention.

BRIEF DESCRIPTION OF THE DRAWINGS

Hereinafter the invention will be explained more closely by way of example with reference to the attached drawings, which also disclose features essential to the invention. There are shown.

DETAILED DESCRIPTION OF VARIOUS EMBODIMENTS

FIG. 1 shows different views of a security element 20 which serves for authentication or for copy protection of an object of value, for example a value document, such as a bank note, etc. The security element 20 provides different views of one and the same motif from the front and back sides in plan view, and the motif disappears in transmission view.

Figures 1A, 1B, 1C:
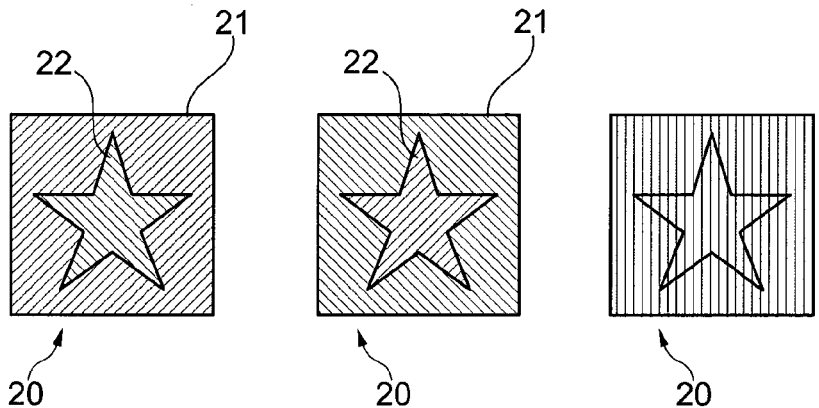
FIGS. 1a-d different views of a security element from the front side (FIG. 1a), the back side (FIG. 1b), in transmission view (FIG. 1c) and as a sectional representation (FIG. 1d), FIG. 2 a sectional representation through a design of the security element 20 of FIG. 1 which, according to a first variant of the invention, consists of a grating ground structure and has two regions, FIGS. 3-5 sectional representations similar to FIG. 2 for further embodiments of the grating ground structure according to the first variant, FIG. 6 a perspective schematic representation of the security element having a further embodiment of the grating ground structure according to the first variant, FIG. 7 a sectional representation through the security element of FIG. 6, FIG. 8 a perspective schematic representation of a further embodiment of the grating ground structure of FIG. 6, FIG. 9 a development of the grating ground structure of FIG. 8, FIG. 10 a modification of the grating ground structure of FIG. 9, FIGS. 11-12 schematic representations to illustrate how the grating ground structure according to the first variant works, FIGS. 13-17 diagrams relating to the filter properties of different grating ground structures, FIG. 18 a schematic representation for the image production within one of the regions, FIG. 19 a sectional representation through a design of the security element 20 of FIG. 1 which consists of a ground element structure having an interference layer construction, FIGS. 20-22 modifications of the design of FIG. 19, and FIG. 23 a modification of the design of FIG. 4 for realizing a second variant of the invention.

FIG. 1 contains four subfigures showing the different views. FIG. 1*a* shows the view of the security element 20 from the front side. It can be seen that a motif in the form of a star stands out against a background 21. The foreground 22 forms the motif, in the example the star. The different hatching illustrates that foreground 22 and background 21 differ in plan view in color and/or play of colors upon tilts and/or reflected intensity. Viewed from the front side, the foreground 22, i.e. the star, appears in reflection e.g. in a different color and intensity from the background 21. When the security element 20 is viewed from the back side there is obtained, as shown in FIG. 1*b*, an inversion of the color impression and intensity impression for the foreground 22 and the background 21. Color and intensity that the foreground 22 had on the front side appear for the background 21 upon viewing on the back side. The same holds accordingly for the background 21 on the front side and the foreground 22 on the back side.

In transmission view (FIG. 1*c*), however, the motif disappears completely even for different viewing angles, since the colors of the star and of the background are identical. In FIG. 1*c* the outline of the star is drawn in only to illustrate this effect. It does not appear, however, since color and intensity are identical for foreground 22 and background 21 in transmitted light.

This effect of the security element 20 is by no means restricted to two-colored motifs in reflection. It is also possible to design a multicolored, for example four-colored, motif in reflection. Said motif would then appear in two colors in transmission. In general, it holds that an n-colored motif appears in reflection through a corresponding design of the security element 20, which will be explained hereinafter, but in transmission as a structure with only n/2 colors.

The plan-view/transmission-view effect can be employed particularly preferably with see-through windows of bank notes or other value documents. The color properties can hardly be imitated by simple means, but can be perceived with the unarmed eye without auxiliary means.

Further, it is possible to test the transmission properties, in particular the disappearance of the motif, by machine, for example with bank-note processing or counting machines. This test can be done using a transmission sensor which is equipped with a multicolored light source, for example a white light source, and captures the transmission in a spatially resolved manner for different wavelengths or different wavelength regions. A simplified variant is also conceivable, wherein the transmission is measured either for a wavelength or as an integral value for white light. In this manner it can be simply tested whether no motif is recognizable in transmission, which would not be the case with conventional printing methods that could be used for imitating the color effect in plan view. The security element 20 can of course also be combined with other structures, such as holograms, etc.

Figure 1D:
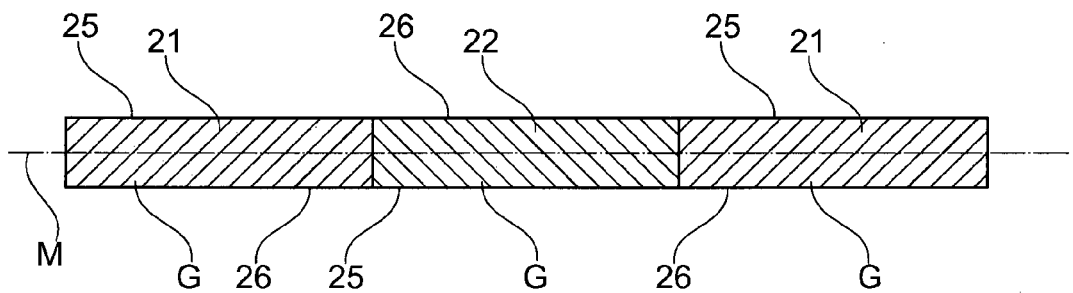

FIG. 1*d* shows a schematic sectional representation through the security element 20 of FIGS. 1*a* to *c*. It can be seen that the security element 20 consists throughout of a ground element structure G, with the ground element structure being inverted in the region of the motif 21 relative to a center plane M lying between the cover surfaces of the security element 20. Said inversion can be a complete mirroring around the center plane M. However, it is also possible that the inversion only relates to certain parameters of the ground element structure G, for example a sequence of refractive indices. Hereinafter a complete inversion or mirroring will be explained, in a first variant. A second variant will relate to the inversion of refractive indices.

The inversion is illustrated by the different hatching in the region of the foreground 22. In the case of a mirroring, it has the consequence that in the region of the background 21 a first cover side 25 of the ground element structure G is located above in the representation of FIG. 1*d* while a second cover side 26 is located below. In the region of the foreground 22 the relations are exactly inverted, i.e. the second cover side 26 is located above and the first cover side 25 below. In both variants the reflecting properties that the ground structure G has are inverted in the region of the foreground 22 relative to the background 21 in each plan view. The transmission properties remain the same due to the law of reciprocity.

The security element 20 produces a color effect through the regionally inverted ground element structure G, which shows different color effects from the front and back sides in plan view. Such ground element structures G are known to the skilled person in many forms. Hereinafter, different variants thereof will be explained.

Relative to the center plane M between front and back sides, which corresponds approximately to the drawing plane in FIG. 1, the ground element structure G is inverted between foreground 22 and background 21 in the first variant. In other words, the structure in the background 21 and foreground 22 is identical structurally, but not with regard to orientation. In the foreground 22 the ground element structure is mirrored on the center plane M.

The ground element structure G has different reflecting properties on its two cover surfaces 25, 26. The different effects in the views of FIGS. 1*a* and 1*b* can thus be described, employing these terms, as follows, the description assuming the example of mirroring (first variant). It equally holds quite generally for the principle of the inversion of properties that are essential for reflection behavior:

In FIG. 1*a* one sees for the background 21 the first cover side 25 of the ground element structure G. In the region of the foreground 22, i.e. of the star, on the other hand, one sees the second cover side 26 of the ground element structure G which is the same except for the orientation. The relations are inverted from the back side in plan view (FIG. 1*b*). One thus sees for the background 21 the second cover side 26 and for the foreground 22 the first cover side 25. The ground element structure G is the same in the total security element 20 except for this change of orientation. It is only mirrored on the center plane M in the foreground 22 relative to the background 21, so that the motif is formed by regions I and II in which the first cover side 25 is visible for the background 21 and the second cover side 26 for the foreground 22 from the front side in plan view. Due to the different reflecting properties of the ground element structure G on the first and second cover sides 25, 26 there is obtained a clear recognizability of the motif.

Figure 2:
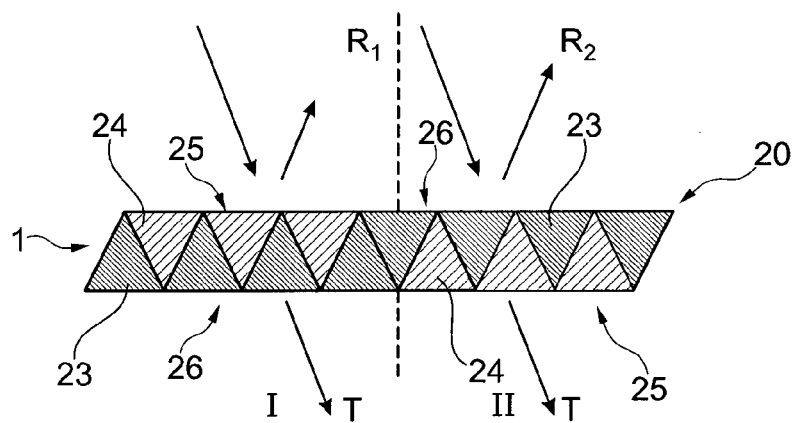

FIG. 2 shows a schematic sectional representation through the security element 20 of FIG. 1, for a first embodiment of the ground element structure G. There are represented side by side the first region I—corresponding to the background 21 for example—and the second region II—corresponding to the foreground 22 for example—separated by a dashed line. The ground element structure G is realized here as a grating ground structure 1. In both regions I and II the grating ground structure 1 is identical except for a transition region, which is already mentioned in the upper, general part of the description and will be explained further hereinafter.

The grating ground structure 1 consists in this embodiment of regular grating ridges 23 and grating grooves 24. In the exemplary embodiment according to FIG. 2, the grating ridges 23 are triangular and the grating grooves 24 likewise. To facilitate manufacture, the grating grooves 24 are filled with a material whose refractive index differs from that of the grating ridges 23. Said filling is not absolutely necessary, however. The grating ground structure 1 is so disposed in the region I that the first cover side 25 is located above in the representation of FIG. 2, and the second cover side 26 below. In the region II the grating ground structure 1 is aligned so as to be inverted thereto, i.e. mirrored on the center plane M, which is the grating plane here. As a result, in the region II the first cover side 25 is located below in the representation of FIG. 2, and the second cover side 26 above.

The grating ground structure 1 reflects radiation incident on the first cover side 25 as reflected radiation R1, and radiation incident on the second cover side 26 as reflected radiation R2. Since the reflecting properties differ on the first and second cover sides in the grating ground structure 1, the reflected radiations R1 and R2 consequently also differ in the regions I and II. The motif, consisting of foreground 22 and background 21, thereby becomes visible.

In the transmitted-light mode, on the other hand, the transmitted radiation T does not differ in the regions I and II, since in both regions the same structures are passed through and the order of passage is irrelevant due to the law of reciprocity of the optical path.

It is an essential property of the ground element structure G that it is not symmetrical with regard to its reflecting properties relative to the first and second cover sides. In the case of a grating this is obtained by the grating ground structure 1 likewise being asymmetrical with regard to the grating's center plane. This is the case in FIG. 1.

Figure 3:
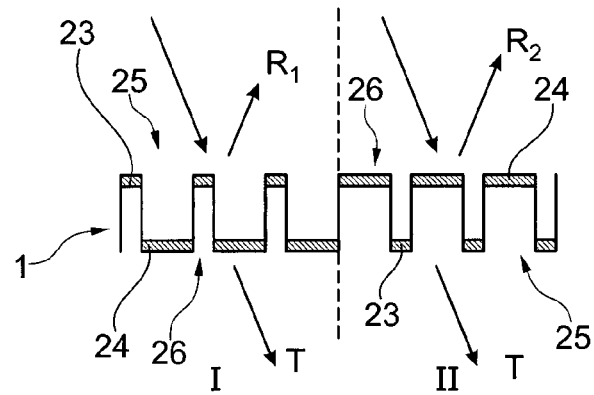

From the point of view of manufacturability, it is preferable to employ an asymmetrical grating ground structure 1 for the security element 20, since such a structure can be simply replicated by an embossing method. Hence, relief gratings are preferably suitable having grating ridges 23 and grating grooves 24 that are asymmetrical relative to the grating's center plane and whose surface is vapor-coated, for example with metal. FIG. 3 shows such a rectangular grating in a representation similar to FIG. 2. In the region II the mirrored profile of the region I is again present. The grating has different reflecting properties but the same transmission in the regions I and II. Relative to the grating's center plane, asymmetrical grating profiles are preferably formed by rectangular gratings with a filling factor that deviates considerably from 0.5. At a value of exactly 0.5 an inversion or mirroring between the regions I and II would not be possible.

Figure 4:
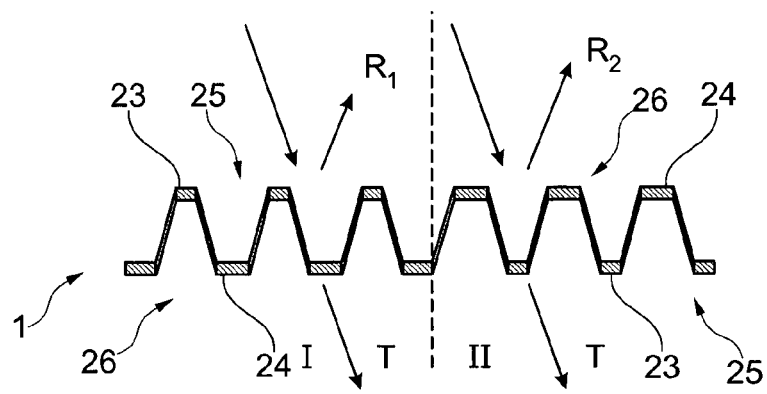

It is simpler to manufacture by an embossing method a trapezoidal profile as is shown schematically in FIG. 4. With such a grating it is also possible—and this is also represented in FIG. 4—for the flanks to be overlaid with a thin layer, for example a thin metal film, upon a directional vapor coating or deposition. Even then the transmission T remains the same for the regions I and II. The same also holds in the case of an oblique angle deposition on such a profile form.

Figure 5:
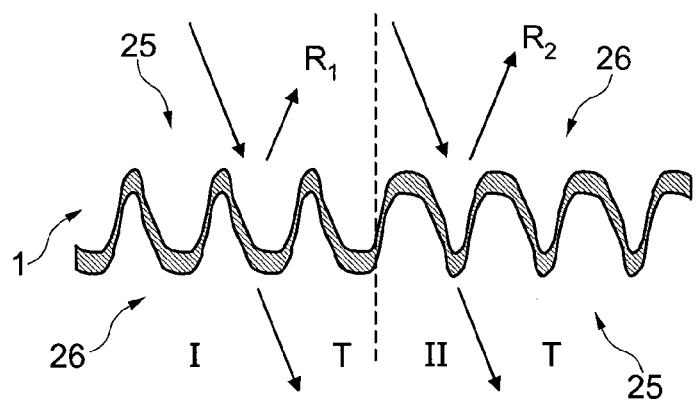

FIG. 5 finally illustrates the general case of a grating ground structure 1 that is asymmetrical with regard to the grating's center plane, and has a mutually mirrored arrangement in the regions I and II.

Figure 6:
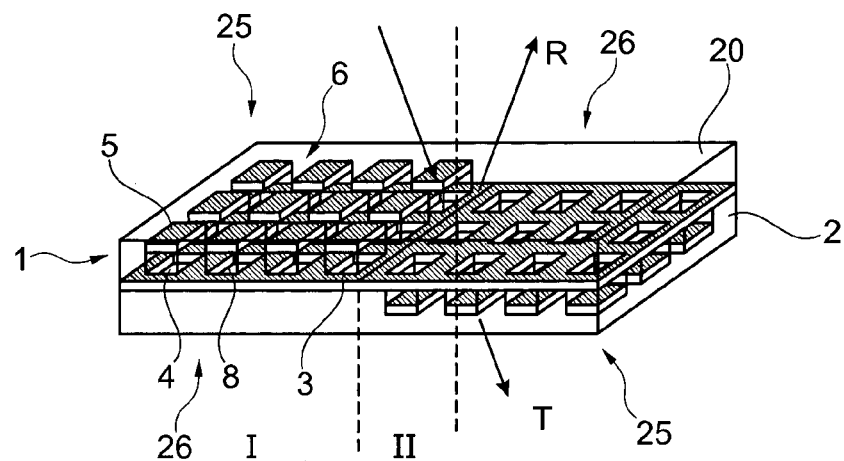
Figure 7:
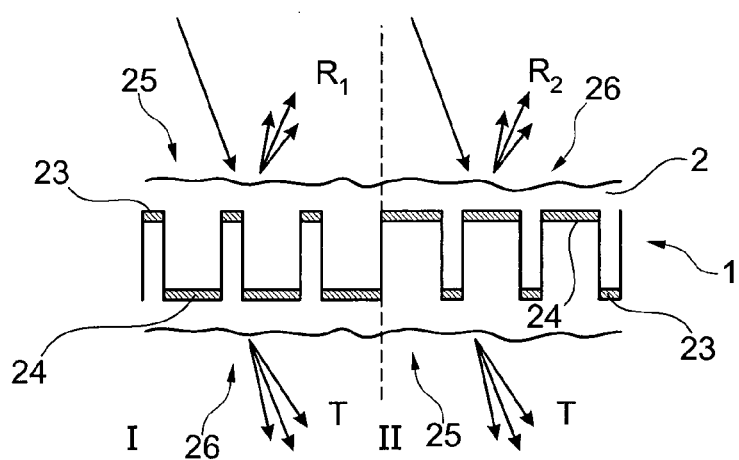

The grating ground structure 1 can be configured one-dimensionally. However, two-dimensionally periodic gratings have the advantage that a substantially stronger asymmetry in the filling factor can be formed, which effectuates even clearer differences between the reflection on the first cover side 25 and the second cover side 26. An especially good contrast in the motif between foreground and background is the consequence. FIG. 6 shows schematically such a two-dimensional periodic grating whose basic principles will be explained more closely hereinafter with reference to FIGS. 8 to 19.

Upon viewing from the upper side, mirroring or specular reflections can occur intrusively under unfavorable conditions. The color properties of the described grating ground structure in reflection can be improved by an additionally applied scattering foil, as FIG. 4 shows. Therein the grating ground structure 1 is embedded into a carrier 2 which has reflection-diminishing properties on its cover surfaces, for example through a suitable scattering foil. Preferably, such a scattering foil has a relatively small angular divergence lying for example between 5° and 20°. This scattering effect can also be achieved by particles in a UV lacquer or in a cover foil or in the carrier 2. The uniform transmission is practically unimpaired by the light scattering, provided the scattering behavior of the carrier 2 or of the layers or foils applied thereon is approximately the same on both cover sides.

In the security element 20 the grating ground structure 1 is the same in the regions I and II except for an inversion or mirroring in one of the regions. This leads to there having to be a transition region at the boundary between the regions I and II, where the grating ground structure 1 runs into its mirrored form. Said transition is illustrated in FIGS. 2b to 7 by a dashed line. The transition region where the ground structure 1 runs into its inverted, i.e. mirrored, form has an extension in the region of a period of the grating structure, which is imperceptible to the unarmed eye due to the employed structure sizes with periods of 1000 nm or less.

With reference to FIGS. 8 to 19 the two-dimensional periodic grating structure of FIG. 6 will hereinafter be explained more closely. The figures relate here only to the grating ground structure, i.e. the configuration in the region I or II.

Figure 8:
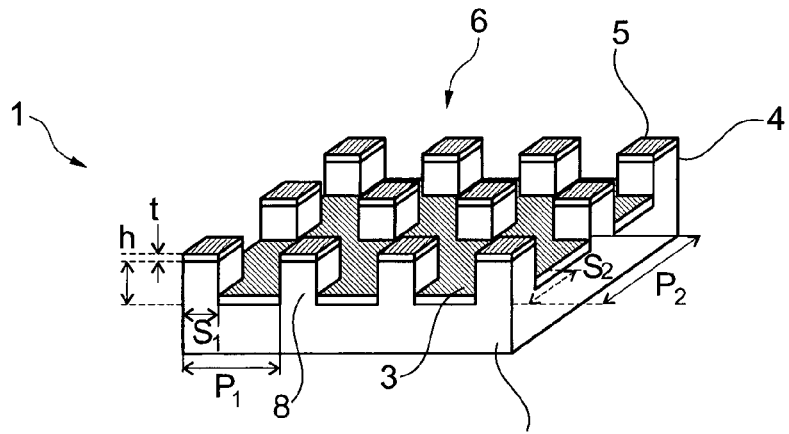

FIG. 8 shows a grating ground structure 1 which can be employed for the security element 20 in a value document. The grating ground structure 1 is manufactured by the carrier 2 being furnished with a profile possessing perpendicular flanks. The profile is so configured that a pattern 6 of pillars 4 is formed on an upper side of the carrier 2. The carrier consists of a dielectric and was coated with a metal layer which is deposited in a ground layer 3 on the surface of the carrier 2 as well as in a coating 5 on the pillars 4. Due to the perpendicular flanks the latter are uncoated.

In principle, the grating ground structure 1 is so configured that it is not completely opaque in the transmitted-light mode, i.e. remains light-transmissive to a certain degree. The layer thickness T of the metal layer is therefore chosen accordingly, as is the material.

In the pattern 6 the pillars 4, which are configured as cuboid here only by way of example and may be, inter alia, cylindrical (not necessarily circular cylindrical) elevations, are disposed in the form of a two-dimensionally periodic grating, with periodicities $p_1$ and $p_2$ being present along two mutually perpendicular directions in the grating plane of the grating ground structure 1, said plane being defined by the ground layer 3. The extensions of the pillars 4 or of the elevations in the ground plane are designated as $s_1$ and $s_2$. The ground layer 3 as well as the coatings 5 have a layer thickness t. The coatings 5 disposed in the pattern 6 are spaced from the upper side of the ground layer 3 by the distance h-t through the height h of the pillars 4. The pillar height h of the profiled carrier 2 is greater than the layer thickness t, so that the metal layer is interrupted and the coatings 5 are not contiguous. There thus arises a metal structure consisting of the ground layer 3 which defines the grating plane, with holes 8 over which the coatings 5 are located. The distance between the coatings 5 and the ground layer 3 is effectuated by the dielectric pillars 4.

The periodicities $p_1$ and $p_2$ preferably lie in the subwavelength region, i.e. in the region between 100 nm and 1000 nm, preferably between 200 nm and 500 nm. The filling factors $s_1/p_1$ and $s_2/p_2$ lie between greater than 0.5 and 0.8, preferably under 0.7. To achieve a color filtering independent of polarization, the profile parameters are chosen identically for the two spatial directions if possible, i.e. $p_1=p_2$ and $s_1=s_2$. This is optional, however. Likewise, the directions of periodicity are mutually perpendicular in the described exemplary embodiment. This too is optional. Spatially asymmetrical arrangements of the profile and of the periodicity are also conceivable. In other words, the pattern 6 need not be a Cartesian pattern, as represented in FIG. 8. Also, the pillars 4 can be designed asymmetrically.

Figure 9:
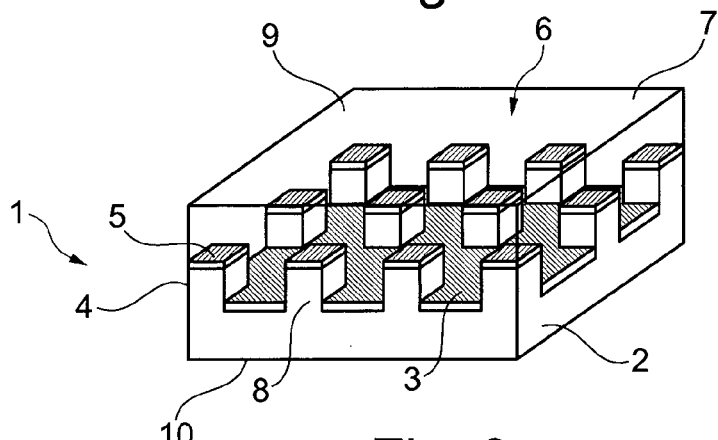

FIG. 9 shows a development in which the grating ground structure 1 is embedded into an embedding dielectric 7. This has use-related advantages, since the surface of the grating ground structure 1 is then smooth.

Figure 10:
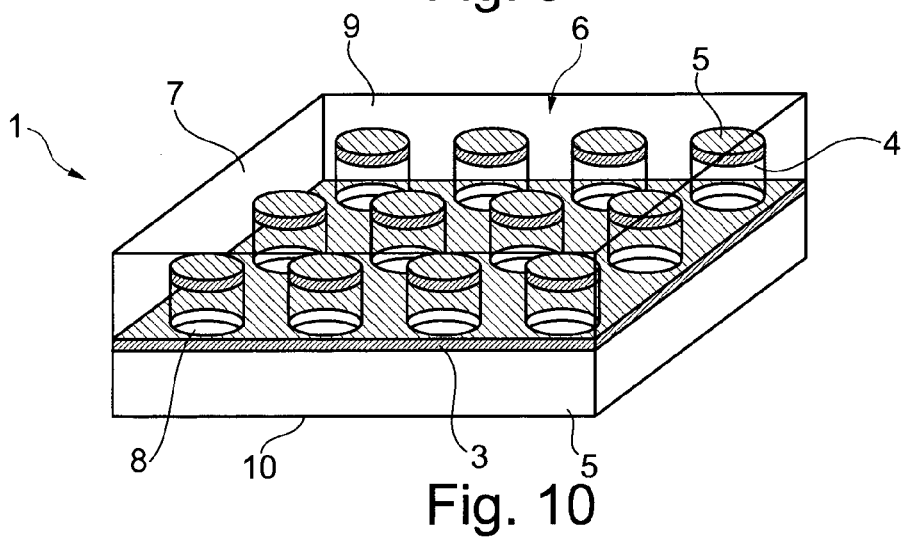

FIG. 10 shows a grating ground structure 1 whose pillars 4 are of circular cylindrical configuration. This form is particularly suited for unpolarized light. Modifications of the square form of FIG. 8 or circular form of FIG. 10 are likewise possible, e.g. through rounded corners for example.

Figure 11:
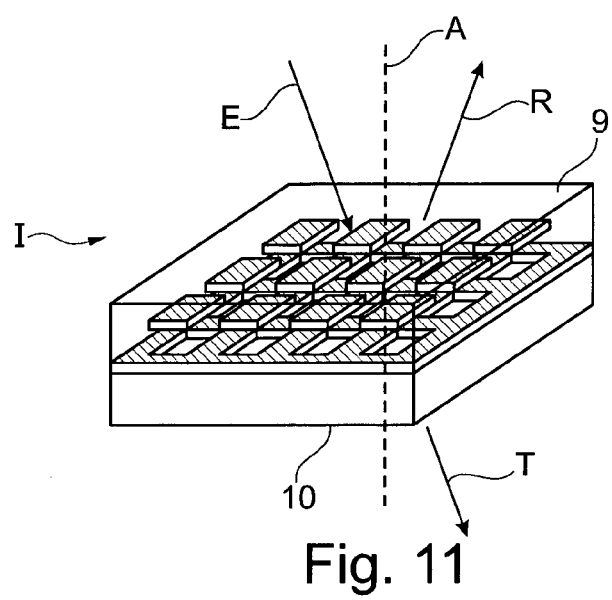
Figure 12:
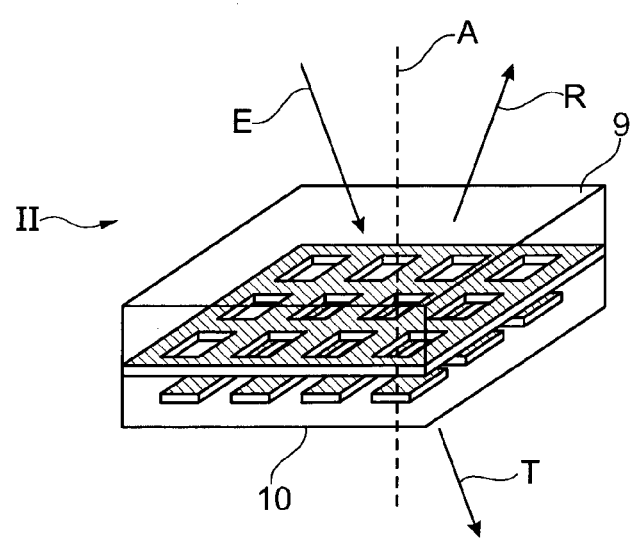

FIGS. 11 and 12 show how the grating ground structure 1 works. FIG. 11 shows the relations upon incident radiation E on the upper side 9 in the region I. FIG. 12 shows the incidence in the region II. The security element reflects incident radiation E in the form of reflective radiation R and transmits a portion as transmitted radiation T. The essential difference between the illumination in the region I and in the region II is that, in the region I, the incident radiation E first falls on the periodic coating 5 disposed in the pattern 6. In the region II, on the other hand, the pattern of the holes 8 in the ground layer 3 is illuminated directly. This difference has clear consequences in reflection behavior, in particular with regard to color impression.

Through the application of the metal layer to the patterned carrier 2, the ground layer 3 is furnished with the holes 8 under the coatings 5, i.e. in the region of the pillars 4. The grating ground structure 1 thus has a so-called hole array in the metal layer 3, with the arrangement of the holes 8 being defined by the pattern 6. When the flanks of the pillar 4 are completely perpendicular, the arrangement and sizes of the holes 8 correspond exactly to those of the coatings 5.

The ground layer 3 of the design of FIGS. 8 to 10 can be supplemented or replaced by multiple layers. The same holds for the coating on the pillars.

For manufacturing the grating ground structure 1 and thus the security element 20, different processes come into consideration. Manufacture is simplest when the dielectric carrier 2 with the elevations disposed in the pattern 6, for example pillars 4, and with the regions I and II is first formed and then coated. This can be effected either perpendicularly or by oblique angle deposition. The essential point is that the coatings 5 are not contiguous, i.e. are single.

For manufacturing the carrier 2 it is possible to use a casting process, so that a cost-efficient mass production can be realized.

The security element 20 described here obtains its coloration through a grating ground structure having a two-dimensional periodic subwavelength structure in the zeroth diffraction order. The color-giving embossed structures are then especially color-intensive, can be disposed in an accurately positioned manner relative to other embossed security structures, and appear in the desired uniform color tone from a relatively wide viewing angle in plan view.

Possible parameters of two-dimensionally periodic gratings are:

| Structure | p [nm] | s [nm] | h [nm] | t [nm] |
| --- | --- | --- | --- | --- |
| a) | 400 | 120 | 300 | 40 |
| b) | 240 | 117 | 300 | 40 |
| c) | 330 | 167 | 300 | 40 |
| d) | 400 | 203 | 310 | 40 |
| e) | 240 | 117 | 300 | 20 |

The structures a)-e) were cast on PET foils in UV lacquer, vapor-coated with aluminum and subsequently laminated with a PET foil. The refractive index of the PET foil and of the UV lacquer amounts to about 1.56 in the visible.

Figure 13:
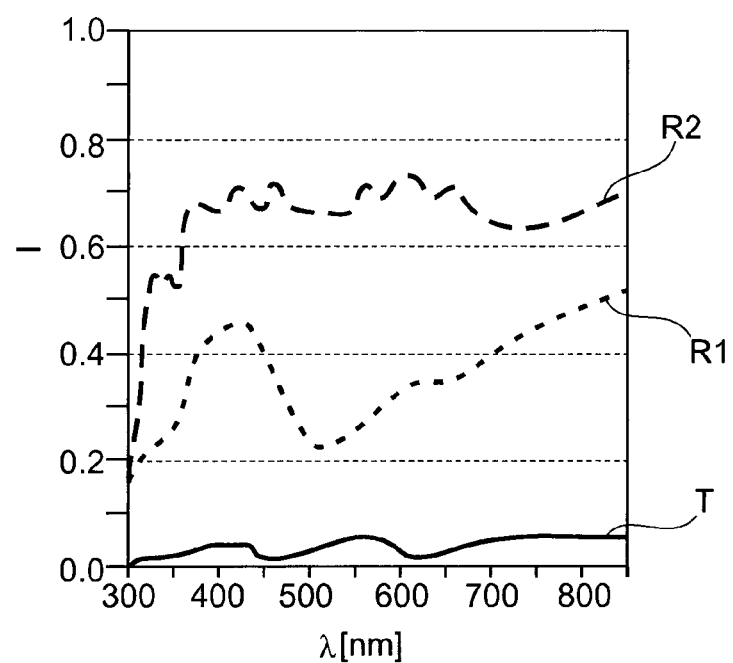
Figure 14:
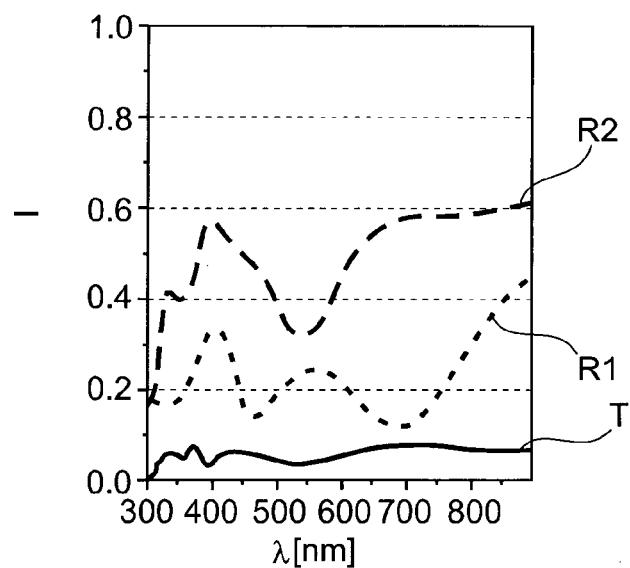

FIG. 13 shows transmission behavior and reflection behavior for structure a). The reflection response on the first cover side is designated as R1, the reflection response on the second cover side as R2, and the transmitted radiation as T. The figures respectively show the intensity I as a function of wavelength. The metal employed was aluminum with a layer thickness t of 40 nm. FIG. 14 shows the responses for the structure b), FIG. 15 for the structure c), and FIG. 16 for structure d).

Figure 15:
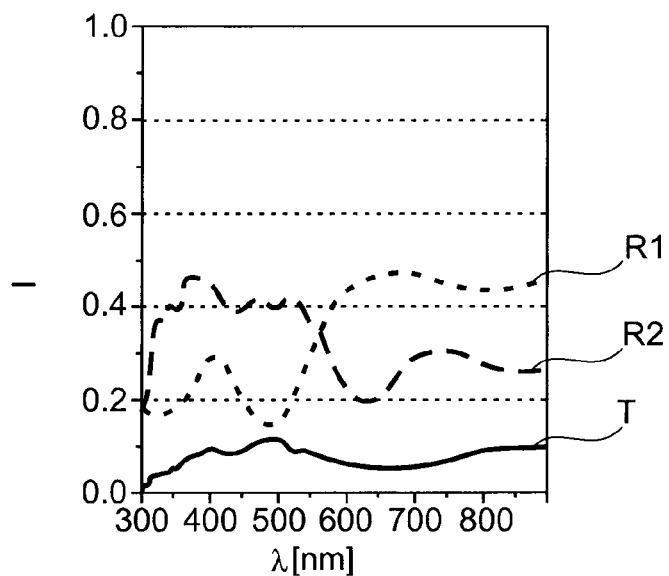
Figure 16:
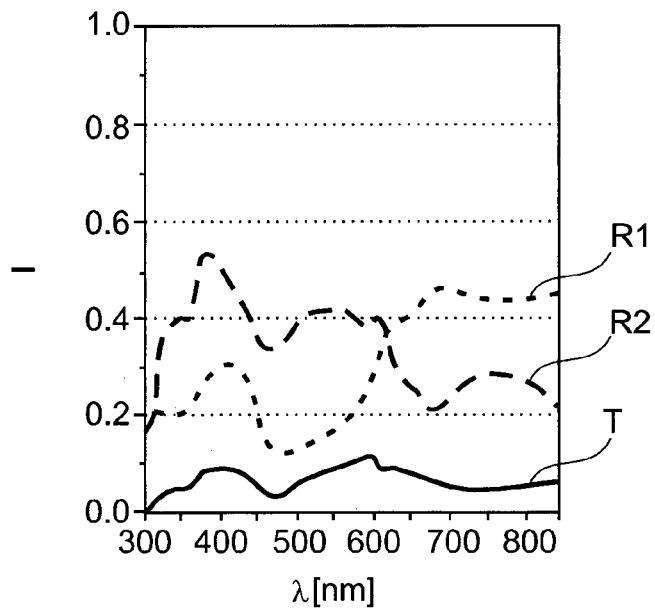
Figure 17:
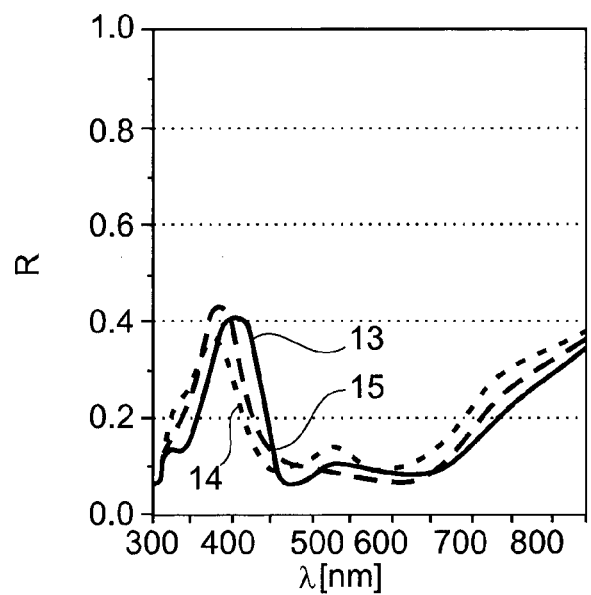

Said grating ground structures show different colors both in reflection and in transmission. The reflection on the first cover side differs quite clearly from the reflection on the second cover side. This stands out most clearly with the structures c) (FIG. 15) and d) (FIG. 16). FIG. 15 demonstrates a red color tone on the first cover side, while the second cover side appears blue. The transmission, on the other hand, is blue viewed from both sides. The structure d) of FIG. 16, however, appears reddish on the first cover side, turquoise on the second cover side, and green in transmission. The angular tolerance of the color tone was examined by reflection measurements at different angles of incidence. FIG. 17 shows the reflection of the structure e) for the angles of incidence 8° (curve 13), 30° (curve 15) and 45° (curve 14). The reflection maximum lies in the blue for this structure, shifting only slightly upon a variation of the angle of incidence. The structure always appears blue for these different angles of incidence.

Figure 18:
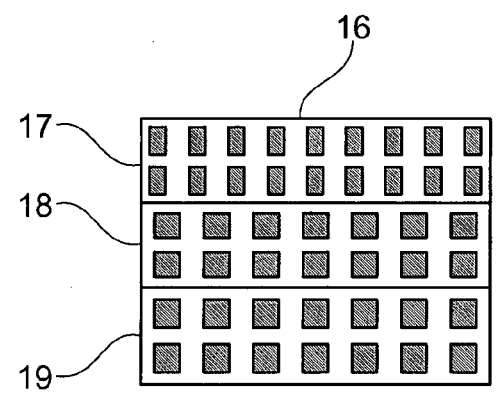
Figure 18:
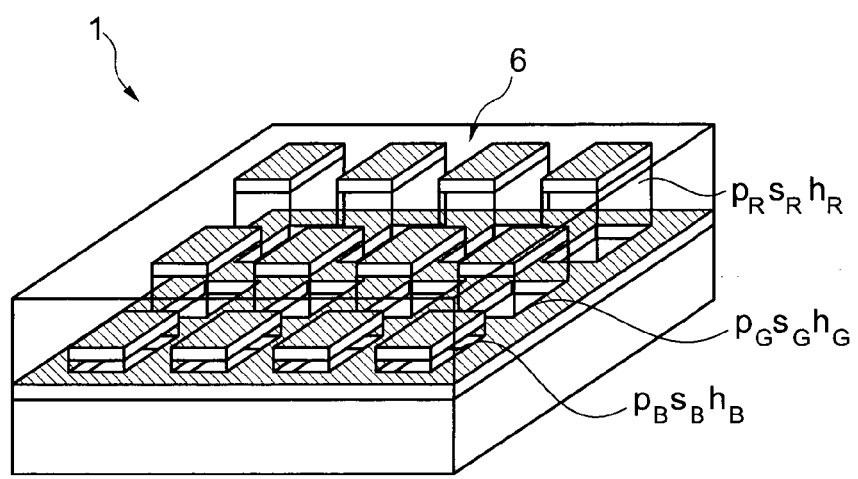

The above-described profile-dependent coloration can be utilized to produce colored symbols or images within one of the regions. FIG. 18 shows three portions 17, 18, 19 of a grating ground structure of different profile ($p_R$, $s_R$, $h_R$), ($p_G$, $s_G$, $h_G$) and ($p_B$, $s_B$, $h_B$) which appear in the colors, red, green and blue. These different colors can be evoked through the corresponding variation of one or more profile parameters.

The three portions 17, 18, 19 correspond to RGB subpixels and together form a pixel 16. In each portion 17, 18, 19 the respective profile ensures that the corresponding colors, red, green and blue, are effectuated. At the same time, through the choice of profile one can adjust the share that the color of the respective RGB subpixel formed by the portion 17, 18 or 19 has in the pixel 16. It is thus possible to give the pixel 16 a desired color. The color mixture of the primary colors that is effectuated in the pixel 16 through the portions 17, 18, 19 of the RGB subpixels thus makes true-color images possible. The advantage of such a structure over a conventional printing method is that a very fine patterning into the micrometer range is possible, which is advantageous in particular with magnification arrangements. The grating ground structure 1 according to FIG. 12 allows microimages wherein the grating profile changes laterally in order to achieve a contrast in color or intensity in the microimage. The structure described here is preferably suited therefor, since its optical properties are very angle-tolerant, i.e. its color hardly changes upon a variation of the angle of incidence. This property is advantageous for a combination with microlens arrays, since the light perceived by a viewer stems from different optical paths having different angles of incidence.

In the regions I and II the images then differ only with regard to their play of colors in plan view; while these differences disappear in transmitted light.

For the security element 20 subwavelength gratings are preferably suited, i.e. grating ground structures 1 having grating elements (for example grating ridges 23 and grating grooves 24) at least one of which is smaller than the wavelength of light. The manufacture of such structures is usually done by photolithographic methods. Interference lithography or mechanical scratching is also possible. An original is finally manufactured that is subsequently copied over, galvanically or using photopolymers (e.g. Omocers), to an embossing stamp with which the carrier 2 is then embossed. Subsequently, the carrier 2 is suitably coated and, where applicable, furnished with lamination layers.

The manufacture of the security element 20 with regions I and II of the grating ground structure 1 that are mirrored on the grating ground plane can be done by assembling the first region of an original with an impression of said original. The embossing stamp can be manufactured in this way as well. The copies of the two regions can be produced e.g. by the exposure of a film made of photopolymers through a mask, and subsequently assembled in a further copying step. The corresponding inversion can of course also already be provided in the original.

For embossing the carrier 2 there can be employed a continuous embossing process for embossing a foil. For this purpose, an embossing cylinder is usually fabricated.

Figure 19:
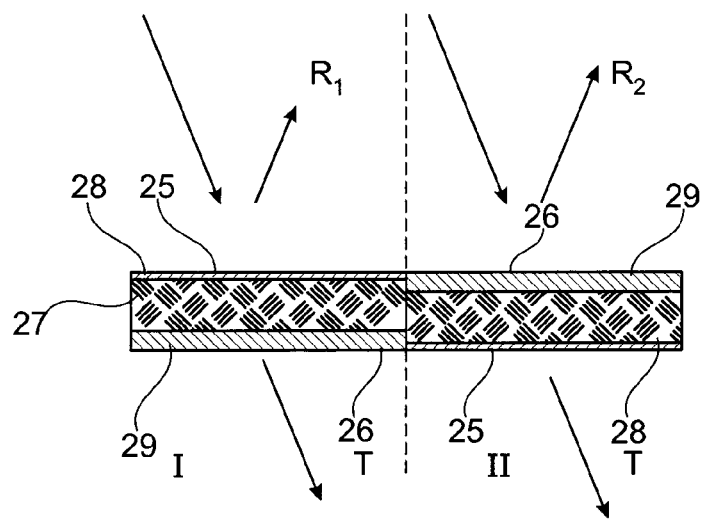

FIG. 19 shows a schematic sectional representation of a further possible form of realization for the security element 20. Here, there is employed as a ground element structure G an interference construction which is executed here as a three-layer construction having a substrate 27 and two semitransparent metal layers 28 and 29. In the regions I and II the ground element structure is mutually mirrored relative to the center plane, so that the first cover side 25 is located above, in the representation of the figure, in the region I but the second cover side 26 in the region II. The same holds accordingly for the sides located below. As a result, the first metal layer 28 is located above for the region I in the image of FIG. 19, but below for the region II. Due to reciprocity the transmission is identical in both regions, while the reflecting properties differ, thereby making the motif recognizable.

It should be pointed out that the step that is to be seen in the substrate 27 between the regions I and II is not present in reality. It merely illustrates the mirroring of the ground structure G in the regions I and II. In reality, the substrate 27 runs through and only the layers 28 and 29 change. This regionally different patterning can be achieved by a washing method or also by laser demetallization. In so doing, the region II is first masked and the layer sequence for the region I applied, for example by a vapor deposition method. In the next step the region I is masked and the layer sequence of the region II vapor-deposited.

Figure 20:
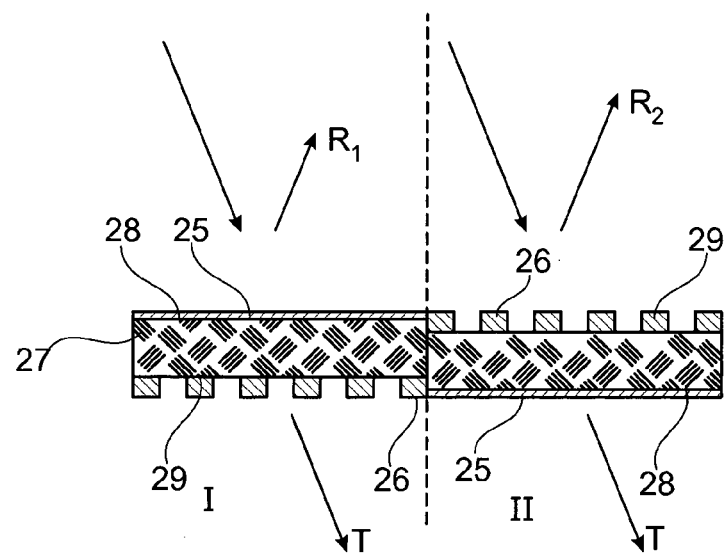

It is also conceivable that one of said metal layers is perforated. This embodiment can be seen in FIG. 20. In known color-shift layer systems, the lower layer is usually designed as an opaque mirror layer. To obtain a transmission, however, said mirror layer can be present in partly perforated form. The semitransparent metal layer 28 is homogeneous, the mirror layer 29 perforated. Said perforation can be produced using a pulsed laser. Alternatively, there can be employed a washing method, a metal transfer method or a so-called lift-off method.

Figure 21:
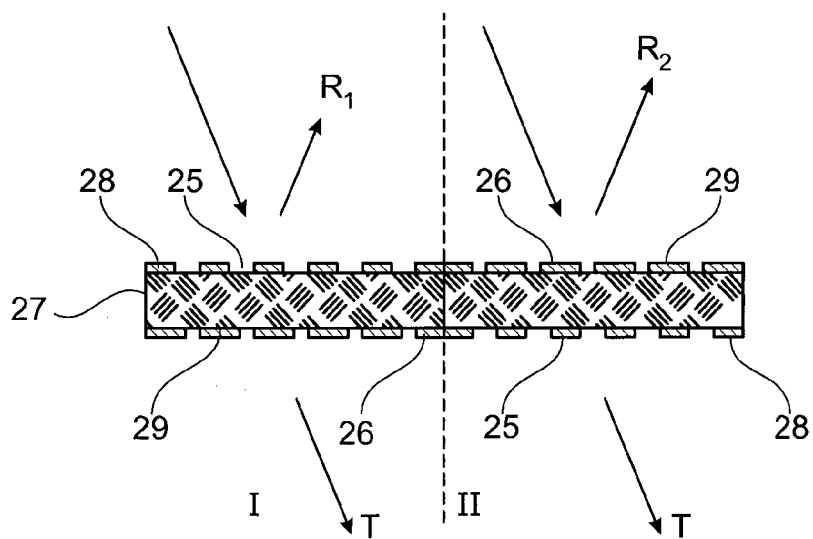

FIG. 21 shows a ground element structure G wherein both layers 28 and 29 are made of the same material and have the same thickness. They are only perforated differently, giving rise to the different reflecting properties. The manufacture of this variant is especially simple, since the individual layers can be applied successively in laterally unpatterned form and over the full surface. The perforation is then performed using a pulsed laser. This is possible on both sides. Alternatively, the perforation can be effected unilaterally after one metal layer has been applied and then after the other metal layer has been applied.

Figure 22:
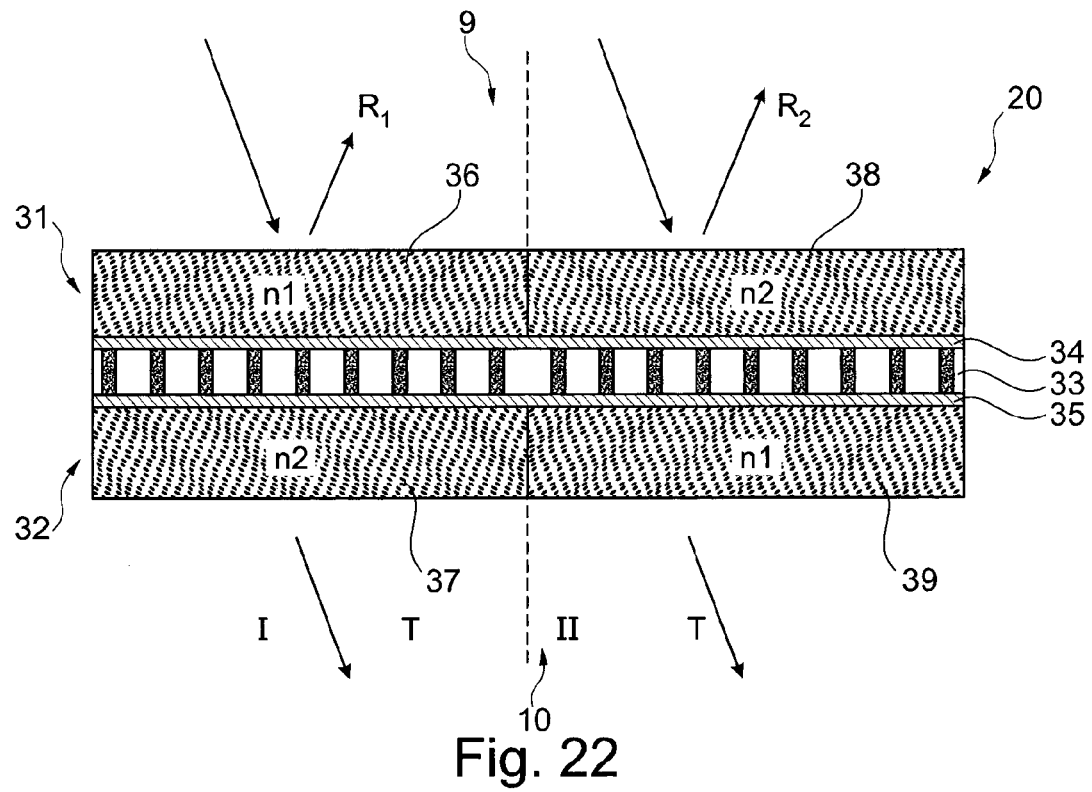

FIG. 22 shows a modification of the design of FIG. 19. Here, the security element is inverted in the regions I and II with regard to its refractive index structure and not mirrored with regard to the geometry.

The security element 20 of FIG. 22 has a dielectric 33 which respectively has a metallization 34, 35 on its front and back sides. Over the metallization 34 there is applied a cover layer 31, and under the metallization 35 a lower layer 32.

The cover layer 31 has two layer portions 36 and 38, with the layer portion 36 lying in the region I and the layer portion 38 in the region II. Likewise, the lower layer 32 is patterned accordingly, so that it has a layer portion 37 in the region I and a layer portion 39 in the region II. The layer portions 36 and 39 have the same refractive index n1. Likewise, the layer portions 37 and 38 have the same refractive index n2 differing from the refractive index n1. Thus, the same layers are present in the region I as in the region II, but inverted with regard to their refractive index structure. This leads to an interaction of the incident light in the regions I and II even in the case of a plane, semitransparent metal layer construction. In the region I the layer system, formed by the layers 33 to 35, borders upwardly on the layer portion 36 with the refractive index n1 and downwardly on the layer portion 37 with the refractive index n2. In the region II the refractive indices are interchanged from the front and back sides. This leads to a different reflection behavior in the two regions. The transmission is identical, however.

Boundary surfaces with different refractive indices can be manufactured by vapor deposition or by printing different dielectrics. The measures described above with reference to the other embodiments are all suitable here, too, for adjusting laterally different layer portions with desired refractive indices.

In FIG. 22, cover layer 31 and lower layer 32 are represented with the same geometry. This is not compulsory. Thus, the cover layer 31 can in fact have a different structure or thickness from the lower layer 32.

Figure 23:
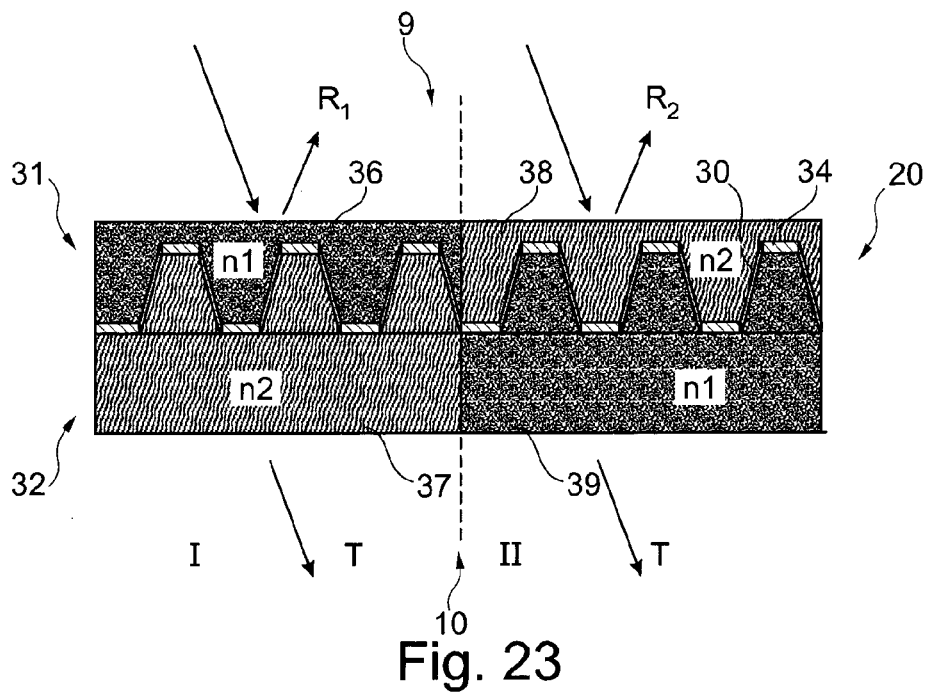

FIG. 23 shows a design according to the possibility of designing a security element that was designated as the second variant at the outset. Here, as also in FIG. 22, an inversion is provided with regard to the refractive index structure and not with regard to the geometry (as in the first variant). The security element 20 of FIG. 23 has a grating structure 30 which is furnished with a metallization 34. The cover layer 31 disposed over the grating structure 30 fills the grating structure. The same holds for the lower layer 32 lying on the other side.

The grating structure 30 is represented by way of example as a relief grating of trapezoidal cross section. However, there can be employed all of the grating structures described here, also the grating structures mentioned in connection with the first variant. Unlike the first variant, it is now not (exclusively) a variation of the profile form of the grating structure 30 that produces the different reflection behavior in the regions I and II, but rather a change in refractive index. The cover layer 31 has different refractive indices, namely the refractive indices n1 and n2, in the layer portions 36 and 38. In the lower layer 32 the refractive indices are exactly inverted thereto, so that the layer portion 37 has the refractive index n2 and the layer portion 39 the refractive index n1. Thus, a different reflection behavior is achieved with a grating structure 30 that is homogeneous in the regions I and II, since the refractive-index jump between the layer portion 36 and the combination of metallization 37 and grating structure 30 shows a reflection behavior on the front side in the region I that corresponds to that on the back side in the region II. The same holds accordingly for the front side of the region II and the back side of the region I. Unlike the above-described first variant, it is thus not the geometry in the regions I and II that is interchanged in the second variant, but rather the arrangement of the refractive indices.

It is of course possible to combine the measures of the first variant and of the second variant, so that the different reflection behavior from front and back sides and the difference between the regions I and II that is no longer recognizable in transmission can be obtained both by an inversion of the geometry and by an inversion of the refractive index cross section.

In principle, the substrate 27 can be dyed in order to produce a colored effect in transmission.

LIST OF REFERENCE SIGNS

1 Grating
2 Carrier
3 Ground layer
4 Pillar
5 Coating
6 Pattern
7 Dielectric
8 Hole
9 Front side
10 Back side
11, 12 Multilayer construction
13, 14, 15 Curve
16 Pixel
17, 18, 19 Portion
20 Security element
21 Background
22 Foreground
23 Grating ridge
24 Grating groove
25 First cover side
26 Second cover side
27 Substrate
28, 29 Interference layers
30 Grating structure
31 Cover layer
32 Lower layer
33 Dielectric
34, 35 Metallization
36-39 Layer portion
h Pillar height
G Ground element structure
M Center plane
t Coating thickness
$s_1$ Pillar width
$s_2$ Pillar depth
$p_1, p_2$ Period
A Surface normal
E Incident radiation
R Reflected radiation
R1 Reflected radiation
R2 Reflected radiation
T Transmitted radiation

The invention claimed is:

1. A security element for an object of value, comprising:
    a flat, transparent body having a front side and a back side between which there lies a center plane;
    a first region configured on the body and a second region configured on the body which encode a motif;
    wherein the body has in the first region a ground element structure which conveys different color impressions from front and back sides in plan view of the body;
    wherein the body likewise has the ground element structure in the second region and in mirrored form relative to the center plane, causing first and second regions to show the motif from both sides in plan view, and the motif to be unrecognizable in transmission view.

2. The security element according to claim 1, wherein the ground element structure has a grating ground structure which is asymmetrical relative to the center plane.

3. The security element according to claim 2, wherein the grating ground structure has grating elements of trapezoidal or triangular profile.

4. The security element according to claim 2, wherein the grating ground structure has a grating period of 100 nm to 1000 nm.

5. The security element according to claim 2, wherein the grating ground structure is overlaid with a thin metal layer, a semimetal layer or a high-refractive layer with a partly absorbent effect.

6. The security element according to claim 2, wherein the grating ground structure is two-dimensionally periodic.

7. The security element according to claim 6, wherein the grating ground structure has a contiguous, partly absorbent ground layer which defines a grating plane, and over the ground layer a two-dimensionally regular pattern of individual partly absorbent surface elements which respectively extend parallel to the grating plane and are respectively spaced from the ground layer by an interlevel dielectric by a distance that is greater than the thickness of the ground layer and of the surface elements.

8. The security element according to claim 7, wherein the regular pattern has a periodicity between 100 nm and 800 nm, in at least two directions extending parallel to the grating plane.

9. The security element according to claim 7, wherein the ground layer has an opening under each surface element.

10. The security element according to claim 7, wherein the grating ground structure is embedded into an embedding dielectric which preferably has the same refractive index as the interlevel dielectric.

11. The security element according to claim 1, wherein the ground element structure has a substrate and two different interference layers disposed on cover sides of the carrier.

12. A security element for an object of value, comprising:
a flat, transparent body having a front side and a back side;
a first region configured on the body and a second region configured on the body which encode a motif;
wherein the body has a grating ground structure which is filled with a first layer from the front side and with a second layer from the back side, and which conveys different color impressions from front and back sides in plan view;
wherein the grating ground structure is the same in the first and second regions and in the first region the first layer has a first refractive index and the second layer a second refractive index, and in the second region the first layer has the second refractive index and the second layer the first refractive index, causing first and second regions to show the motif from both sides in plan view, and the motif to be unrecognizable in transmission view.

13. The security element according to claim 12, wherein the grating ground structure is asymmetrical relative to a center plane lying between front and back sides.

14. The security element according to claim 12, wherein the grating ground structure has grating elements of trapezoidal or triangular profile.

15. The security element according to claim 12, wherein the grating ground structure has a grating period of 100 nm to 1000 nm.

16. The security element according to claim 12, wherein the grating ground structure is overlaid with a thin metal layer, a semimetal layer or a high-refractive layer with a partly absorbent effect.

17. The security element according to claim 12, wherein the grating ground structure is two-dimensionally periodic.

18. The security element according to claim 17, wherein the grating ground structure has a contiguous, partly absorbent ground layer which defines a grating plane, and over the ground layer a two-dimensionally regular pattern of individual partly absorbent surface elements which respectively extend parallel to the grating plane and are respectively spaced from the ground layer by an intermediate layer by a distance that is greater than the thickness of the ground layer and of the surface elements.

19. The security element according to claim 18, wherein the regular pattern has a periodicity between 100 nm and 800 nm, in at least two directions extending parallel to the grating plane.

20. The security element according to claim 18, wherein the ground layer has an opening under each surface element.

* * * * *